US010552225B2

(12) United States Patent
Ganesan et al.

(10) Patent No.: US 10,552,225 B2
(45) Date of Patent: Feb. 4, 2020

(54) VIRTUAL DEVICE MIGRATION OR CLONING BASED ON DEVICE PROFILES

(71) Applicant: VMWARE, INC., Palo Alto, CA (US)

(72) Inventors: Hariharan Jeyaraman Ganesan, Bangalore (IN); Jinto Antony, Bangalore (IN); Madhusudhanan Gangadharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 136 days.

(21) Appl. No.: 15/798,411

(22) Filed: Oct. 31, 2017

(65) Prior Publication Data

US 2019/0012208 A1   Jan. 10, 2019

(30) Foreign Application Priority Data

Jul. 4, 2017   (IN) .............................. 201741023528

(51) Int. Cl.
*G06F 9/44* (2018.01)
*G06F 9/50* (2006.01)
*G06F 9/455* (2018.01)
*G06F 9/48* (2006.01)

(52) U.S. Cl.
CPC ........ *G06F 9/5044* (2013.01); *G06F 9/45558* (2013.01); *G06F 9/4868* (2013.01); *G06F 9/5077* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| 10,015,241 | B2 * | 7/2018 | Marr | G06F 9/5044 |
|---|---|---|---|---|
| 2007/0130208 | A1 * | 6/2007 | Bornhoevd | G06F 9/485 |
| 2010/0281482 | A1 * | 11/2010 | Pike | G06F 9/44505 718/102 |
| 2010/0306337 | A1 * | 12/2010 | DeHaan | G06F 1/266 709/213 |
| 2011/0085563 | A1 * | 4/2011 | Kotha | H04L 41/0816 370/401 |
| 2013/0031342 | A1 * | 1/2013 | French | G06F 9/4418 713/2 |
| 2014/0082616 | A1 * | 3/2014 | Kurita | G06F 9/455 718/1 |
| 2014/0229944 | A1 * | 8/2014 | Wang | G06F 9/5088 718/1 |
| 2016/0241637 | A1 * | 8/2016 | Marr | G06F 9/5044 |
| 2016/0306587 | A1 * | 10/2016 | Dornemann | G06F 11/1471 |

(Continued)

*Primary Examiner* — Insun Kang

(57) ABSTRACT

Techniques for placing virtual machines based on compliance of device profiles are disclosed. In one embodiment, a list of device profiles may be maintained, with each device profile including details of at least one virtual device and associated capabilities. Further, a device profile from the list of device profiles may be assigned to a virtual machine running on a first host computing system. A virtual device and associated configurations required by the virtual machine may be identified to comply with the device profile. A management operation may be performed to migrate or clone the virtual device and associated configurations from a second host computing system to the first host computing system to support the compliance of the device profile assigned to the virtual machine.

17 Claims, 7 Drawing Sheets

(56) References Cited

U.S. PATENT DOCUMENTS

| | | | | |
|---|---|---|---|---|
| 2016/0335108 A1* | 11/2016 | Ryu | ................... | G06F 9/45558 |
| 2017/0212784 A1* | 7/2017 | Johnsen | .............. | H04L 61/6045 |
| 2017/0228245 A1* | 8/2017 | Hardy | ................ | G06F 9/45558 |
| 2018/0254951 A1* | 9/2018 | Kumarasamy | ........ | G06F 15/177 |
| 2018/0262563 A1* | 9/2018 | Mohammed | ........ | H04L 67/1031 |
| 2018/0307510 A1* | 10/2018 | Kottomtharayil | ....... | G06F 9/505 |
| 2018/0314694 A1* | 11/2018 | Dornemann | ........ | G06F 16/2308 |
| 2018/0332005 A1* | 11/2018 | Ettema | ................ | H04L 63/0227 |
| 2018/0373597 A1* | 12/2018 | Rana | ................... | G06F 11/1448 |
| 2019/0097835 A1* | 3/2019 | Bhat | ....................... | G06F 21/41 |
| 2019/0108157 A1* | 4/2019 | Nakagawa | ................ | G06F 3/06 |
| 2019/0141166 A1* | 5/2019 | Johnsen | ................. | H04L 67/34 |

\* cited by examiner

| S.NO | DEVICE PROFILE DATA | HOST/CLUSTER | VM | DEVICE PROFILE | COMPLIANCE |
|---|---|---|---|---|---|
| 1 | SSD (250 GB), FAX MODULE | HOST 1 | VM1,VM3 | PROFILE 1 | COMPLIANT |
| 2 | DDR3,SATA HDD | HOST 3, CLUSTER3 | VM6,VM9,VM21 | PROFILE 7 | COMPLIANT |
| 3 | WIFI MODULE, USB 3.0 | HOST 6 | VM8,VM10 | PROFILE 1 | NON COMPLIANT |
| 4 | GPU, 10GB ETHERNET,SCSI,SUPER IO | HOST 9 | VM5 | PROFILE 3 | COMPLIANT |
| 5 | IEEE 1394, INFIBAND | HOST 14, CLUSTER6 | VM2,VM4 | PROFILE 4 | COMPLIANT |

VIRTUAL DEVICE MIGRATION OR CLONING BASED ON DEVICE PROFILES

RELATED APPLICATIONS

Benefit is claimed under 35 U.S.C. 119(a)-(d) to Foreign Application Serial No. 201741023528 filed in India entitled "VIRTUAL DEVICE MIGRATION OR CLONING BASED ON DEVICE PROFILES", on Jul. 4, 2017, by VMware, Inc., which is herein incorporated in its entirety by reference for all purposes.

The present application is related in subject matter to U.S. patent application Ser. No. 15/798,400, which is incorporated herein by reference.

TECHNICAL FIELD

The present disclosure relates to cluster resource management, and more particularly to methods, techniques, and systems for migrating or cloning virtual devices in a cluster based on compliance of device profiles.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide hardware resources, such as memory, central processing units (CPUs) and so on, for VMs. Each VM is a complete execution environment, and the server provides a user interface over the network connection so that user inputs and outputs are communicated between the user and the VM.

Further, host computing systems may be configured with one or more virtual devices such as a virtual network interface card (vNIC), a virtual compact disc read-only-memory (vCDROM), a virtual graphics processing unit (vGPU) card, a virtual small computer system interface (vSCSI) card, and the like. Furthermore, different generations of host computing systems can support different types of virtual devices.

Hardware/device upgrades, support for new virtual devices/existing virtual devices firmware, or peripheral device upgrades may be needed for business compulsions along with security concerns. During migrations or post failover, critical VMs in need of a specific virtual device or updating virtual device configurations may experience a significant downtime.

Figure 1:
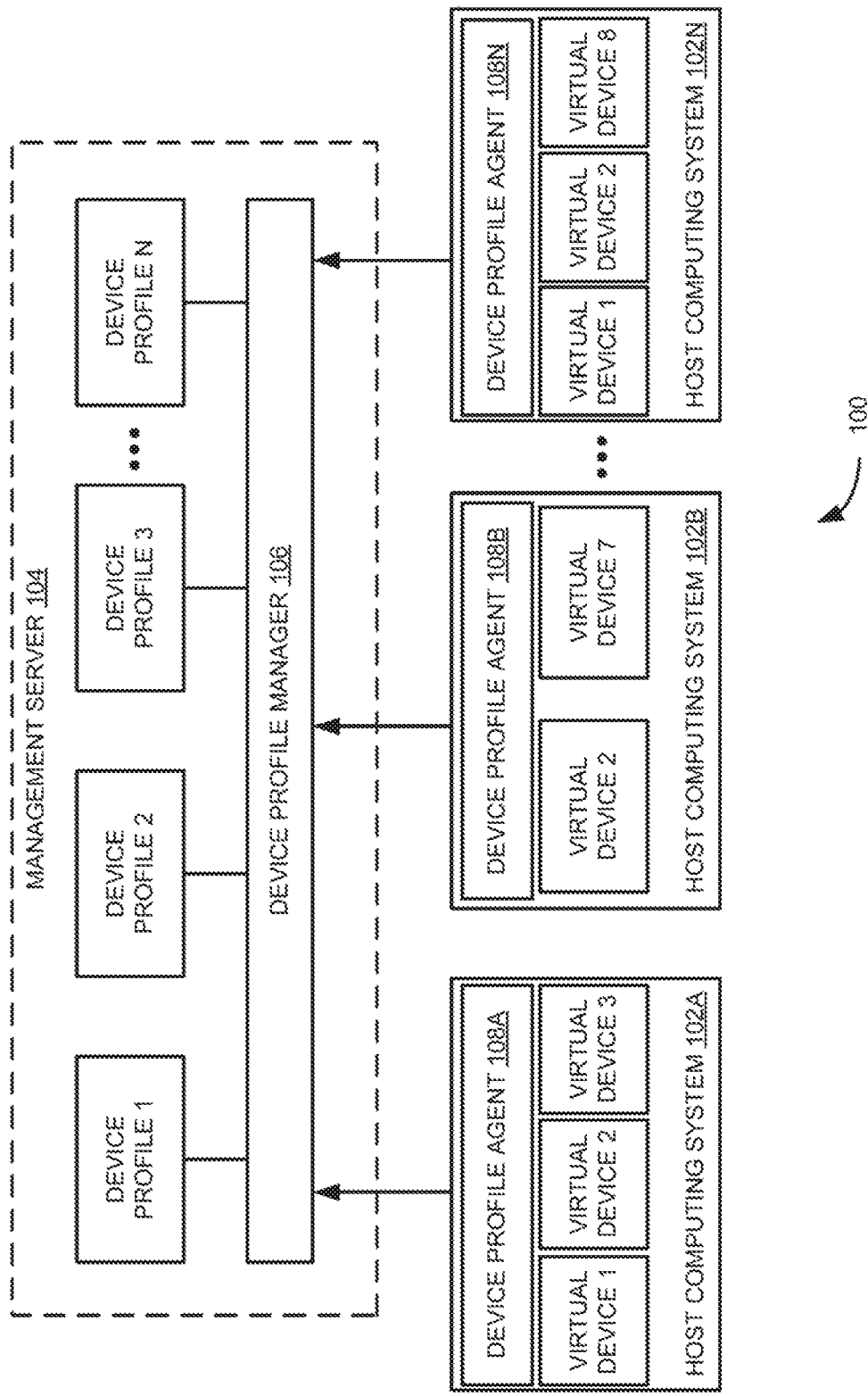
FIG. 1 is an example system view of a virtualized computing environment illustrating maintaining mapping information between device profiles and host computing systems in a cluster.

The drawings described herein are for illustration purposes only and are not intended to limit the scope of the present subject matter in any way.

DETAILED DESCRIPTION

Embodiments described herein may provide enhanced computer-based and network-based method, technique, and system for migrating or cloning virtual devices in a cluster based on compliance of device profiles assigned to VMs. The VMs, in some embodiments, may operate with their own guest operating systems on a host computing system using resources of the host computing system virtualized by virtualization software (e.g., a hypervisor, virtual machine monitor, and the like). The VMs can be placed on host computing systems in the cluster, for instance, during initial placement of VMs, powering on VMs, migration of VMs, provisioning of VMs, creation of VMs, or cloning of VMs. Further, the term "device profile" may refer to a logical entity of a group of available virtual devices and associated device capabilities that the host computing systems can support in a data center inventory.

During failover or load balancing in the cluster, VMs may need to be powered on or migrated to a suitable host computing system that can support the VM specifications/requirements. For example, a management server may not locate a suitable host computing system where the VM specification is honored at real time during load balancing, to keep the VM running state with the required hardware devices available. Further, a high availability fault domain manager (FDM) may not failover the VMs to a suitable host computing system that can support the current VM backend requirement and configurations, and may not recover the device configuration parameters in a destination host computing system.

Furthermore, the VMs cannot be rightly provisioned with a host computing system compatibility check, to suit the needs of the virtual devices that are connected to the VMs. For example, some application may need a specific virtual device mapped to a specific hardware device (e.g., specific video graphics array (VGA) card, graphics processing unit (GPU) card, and the like) for the VM to operate. Some software license may be linked to the virtual devices. Some high availability solutions may need specific media access control (MAC) settings for vNICs. Some high availability solutions may need specific SCSI channel settings (e.g., type, ID, channel, and the like) for the virtual SCSI cards. In Linux operating system (OS), the MAC address of the vNIC may need to be maintained to operate the VMs.

Examples described herein may provide a list of device profiles, each device profile including details of at least one virtual device and associated capabilities. Further, a device profile manager may assign a device profile to a VM running on a first host computing system. Furthermore, the device profile manager may identify virtual devices and associated configurations required by the VM to make the device profile compliant. The device profile manager may identify one or more other host computing systems that operate/run the identified virtual devices and associated configurations. In addition, the device profile manager may migrate or clone the virtual devices and associated configurations from the other host computing systems to the first host computing system to make the device profile compliant. Thus, the virtual devices and associated configurations can be migrated or cloned from one host computing system to another to honor the device profile assigned to the VM and to make sure that the required backend virtual devices and configurations are available to the VM.

Examples described herein may provide device profiles that can ensure the requested virtual devices are compliant and supported by the host computing systems in the data center inventory and be available in the management application (e.g., vSphere virtual center that is offered by VMware). The management application can be provided in a physical server, VM, or container. Examples described herein may enable placing the VMs in the right host computing systems. Examples described herein may secure load balancing of VMs in the cluster with known available virtual device slots and current virtual device states. Examples described herein may provide high availability protections in the right host computing systems where the virtual devices associated with the VMs can be honored. Examples described herein may enable placing the fault tolerance (FT) VMs in the right host computing systems.

System Overview and Examples of Operation

FIG. 1 is an example system view of a virtualized computing environment 100 illustrating maintaining mapping information between device profiles (e.g., device profiles 1-N) and host computing systems 102A-102N in a cluster. As shown in FIG. 1, host computing systems 102A-N may include device profile agents 108A-N, respectively. Each host computing system 102A-N may include VMs running therein. In some examples, a VM is an emulation of a computer system that operates based on a particular computer architecture, while functioning as a real or hypothetical computer. VM implementations may involve specialized hardware, software, or a combination of both.

Further, host computing systems 102A-N may support virtual devices (e.g., virtual devices 1, 2, 3, 7, and 8). For example, host computing system 102A may support virtual devices 1-3, host computing system 102B may support virtual devices 2 and 7, and host computing system 102N may support virtual devices 1, 2, and 8. Example virtual device may include, but not limited to, a virtual network interface card (vNIC), a virtual compact disc read-only-memory (vCDROM), a virtual graphics processing unit (vGPU) card, a virtual small computer system interface (vSCSI) card, and a virtual hard drive. In some examples, a hypervisor manages a corresponding virtual hardware platform that includes a plurality of virtual devices that emulate hardware for VMs.

Further, virtualized computing environment 100 may include a management server 104 communicative with host computing systems 102A-N. Management server 104 may include a device profile manager 106. Device profile manager 106 can be a part of management software residing in management server 104. One skilled in the art can appreciate that device profile manager 106 can also be provided in a software application that can run on host computing systems 102A-N.

Device profile manager 106 may maintain a list of device profiles 1-N, each device profile including details of virtual devices and associated capabilities. In some examples, each device profile in the list of device profiles is assigned a priority (e.g., in the range of 1-N, with 1 being the highest priority). In such cases, the compliance of the device profiles may be checked according to the assigned priority. In some other examples, each device profile may be associated with a flag, for instance, where a flag of 1 indicates that the device profile is enforced/hard rule, a flag of 2 indicates that the device profile is preferred (e.g., profile manager 106 may try to satisfy the device profile), and the like.

The list of device profiles 1-N may be stored in, for instance, memory of management server 104. Further, device profile manager 106 may maintain mapping information, which includes mapping of the list of device profiles 1-N to a corresponding one of a plurality of host computing systems 102A-N that supports the device profiles. For example, a device profile may be a logical entity of a group of available virtual devices 1, 2, 3, 7, and 8 and associated device capabilities that host computing systems 102A-N can support in the data center inventory. The device profiles can be created, edited, or deleted and can be associated to the VMs to achieve relevant device configurations. Some of the virtual devices may be associated with a physical device.

Further, device profile manager 106 may be communicative with device profile agents 108A-N to obtain information related to addition, modification, or deletion of virtual devices and associated versions in host computing systems 102A-N via a corresponding device profile agent 108A-N residing in host computing systems 102A-N. Each of device profile agents 108A-N may reside in one of host computing systems 102A-N and capable of retrieving addition, modification, deletion, and/or capabilities of virtual devices and associated versions and publishing back to device profile manager 106. Device profile manager 106 may update the mapping information based on the obtained information. In one example, device profile manager 106 may receive/obtain information related to addition, modification, or deletion of virtual devices and associated versions through a push or pull mechanism. In the pull mechanism, device profile manager 106 may request and pull the information from the device profile agents 108A-N. In push mechanism, device profile agents 108A-N may push the information to device profile manager 106.

Figure 2:
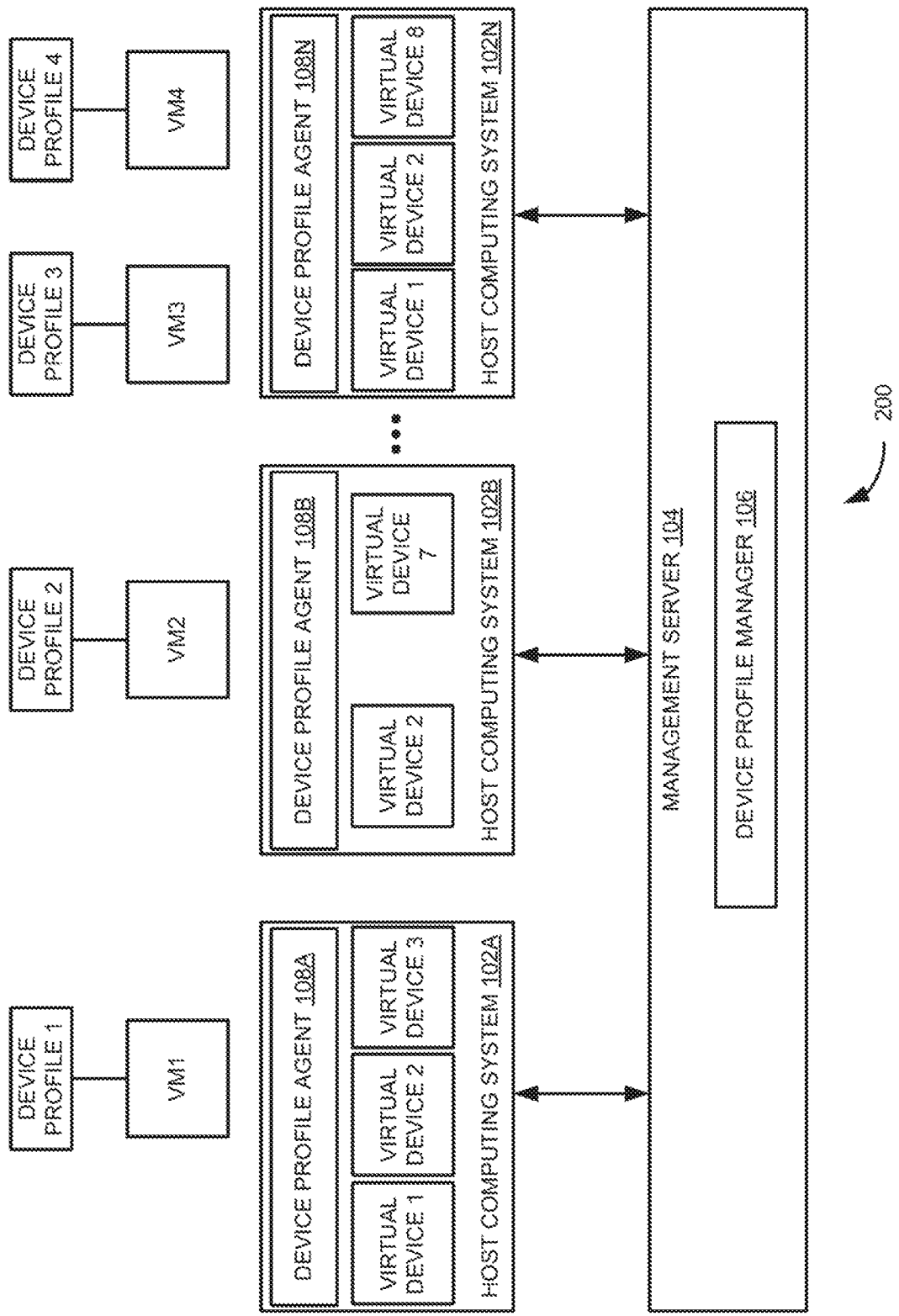
FIG. 2 is an example system view of a virtualized computing environment illustrating assigning the device profiles to virtual machines (VMs) in the cluster.

FIG. 2 is an example system view of a virtualized computing environment 200 illustrating assigning the device profiles 1-N to VMs in the cluster. In the example shown in Further, VMs 1-4 may run on respective host computing systems 102A-N. Device profile manager 106 may assign a device profile from the list of device profiles 1-N to a VM. For example, as shown in FIG. 2, profiles 1-4 are assigned to VMs 1-4, respectively.

Device profile manager 106 may identify virtual devices and associated configurations required by VMs 1-4 based on compliance with the device profile. Further, device profile manager 106 may perform a management operation to migrate or clone the virtual devices and associated configurations between the host computing systems to support the compliance of the device profiles assigned to VMs 1-4 in the order of the priority of the device profiles. Example management operation may include a virtual device cloning or a virtual device migration. In migration operation, a primary virtual device is terminated after the migration completes, and in cloning operation, the primary and backup (or destination) virtual devices both continue to run after the cloning operation completes.

For example, consider a cluster having 10 host computing systems (i.e., H1 to H10). Further, consider that VM1 is attached with a device profile A and VM2 is associated with no device profiles and both VM1 and VM2 are placed on host computing system H1. Also, consider that device profile A holds all needed configurations of the virtual devices (e.g., V1-V4) associated with host computing systems (H1, H2, and H5). When device profile manager 106 checks for the compliance of device profile A, VM1 placed on host computing system H1 can take care of VM1 compatibility based on attached device profile A. Consider that VM1 goes for a load balancing due to resource constraints. Distributed resource scheduling mechanism supporting device profiling may enable migration of VM1 to a host computing system H2 or H5 based on the virtual device slots availability since H2 and H5 supports device profile A. Similarly, VM1 can also be powered-on on a selected host computing system during high availability failover (i.e., failure of host computing system HI) in the cluster.

In another example, consider that host computing systems H2 and H5 can support virtual devices V1-V3 and do not support virtual device V4. In this example, consider VM1 may be migrated to host computing system (e.g., H2) that provides maximum support for device profile A attached to VM1. After migrating VM1, virtual device V4 can be migrated or cloned to host computing system H2 and migrated/cloned virtual device V4 can be attached to VM1.

In yet another example, consider VM2 running on host computing system H1 is attached with device profile B to support additional virtual devices that is not currently associated with VM2. For example, consider that device profile B holds all needed configurations of the virtual devices (e.g., V1-V3 and V5-V7). Also consider that host computing system H1 can support virtual devices V1-V3 and does not operate virtual devices V5-V7. However, host computing system H1 has the relevant physical backend to support the additional virtual devices V5-V7. In this scenario, the additional virtual devices V5-V7 supporting device profile B can be migrated or cloned to host computing system H1 from one or more other host computing systems (i.e., operating the virtual devices V5-V7 in the data center inventory) to achieve the device profile compliance of VM2. Further, any of the device configurations can be migrated/cloned and reconfigured on VM2, without having any additional interventions, and thereby preserving the device state.

Example device configurations may include inside configurations and outside configurations. Inside configurations may refer to configurations that may be performed in the guest operating system of a VM. Example inside configurations may include internet protocol (IP) address, subnet, gateway and the like. Inside configurations may not be directly accessed by the device profile agent 108 in host computing systems. Inside configurations may need an agent running in the VM to communicate to the device profile agent 108. Outside configurations may refer to configurations that may be attached outside the guest operating system. Outside configurations may be specific to virtual devices. Example outside configurations may include MAC address (e.g., set in basic input/output system (BIOS) of a NIC), ISO image, and the like. Outside configurations can be directly accessed by the device profile agent 108.

Consider an example of a vNIC. Each virtual machine has one or more vNICs. The guest operating system and application programs communicate with a vNIC through either a commonly available device driver or a device driver optimized for the virtual environment. In either case, communication in the guest operating system occurs just as the communication would happen with a physical device. Outside the virtual machine, the vNIC has its own MAC address and one or more IP addresses. vNIC responds to the standard Ethernet protocol as would a physical NIC. An outside agent does not detect that vNIC is communicating with a virtual machine.

Real-time examples for migrating a virtual device and associated configurations may include:
  Migrating a vNIC with MAC address and the IP address (e.g., with the help of an agent residing in the host computing system) or any feature of the vNIC such as TCP/IP Offload Engine (TOE).
  Migrating vCDROM and attaching the same image file (e.g., ISO image), enabling/disabling auto-run, and the like.
  Migrating a vGPU card with all the settings.
  Migrating a vSCSI card with all the settings and related Virtual Machine Disk (VMDK) attached to vSCSI card.
  Migrating a vSCSI card with Linear Tape-Open (LTO)/tape drive.

Figure 3:
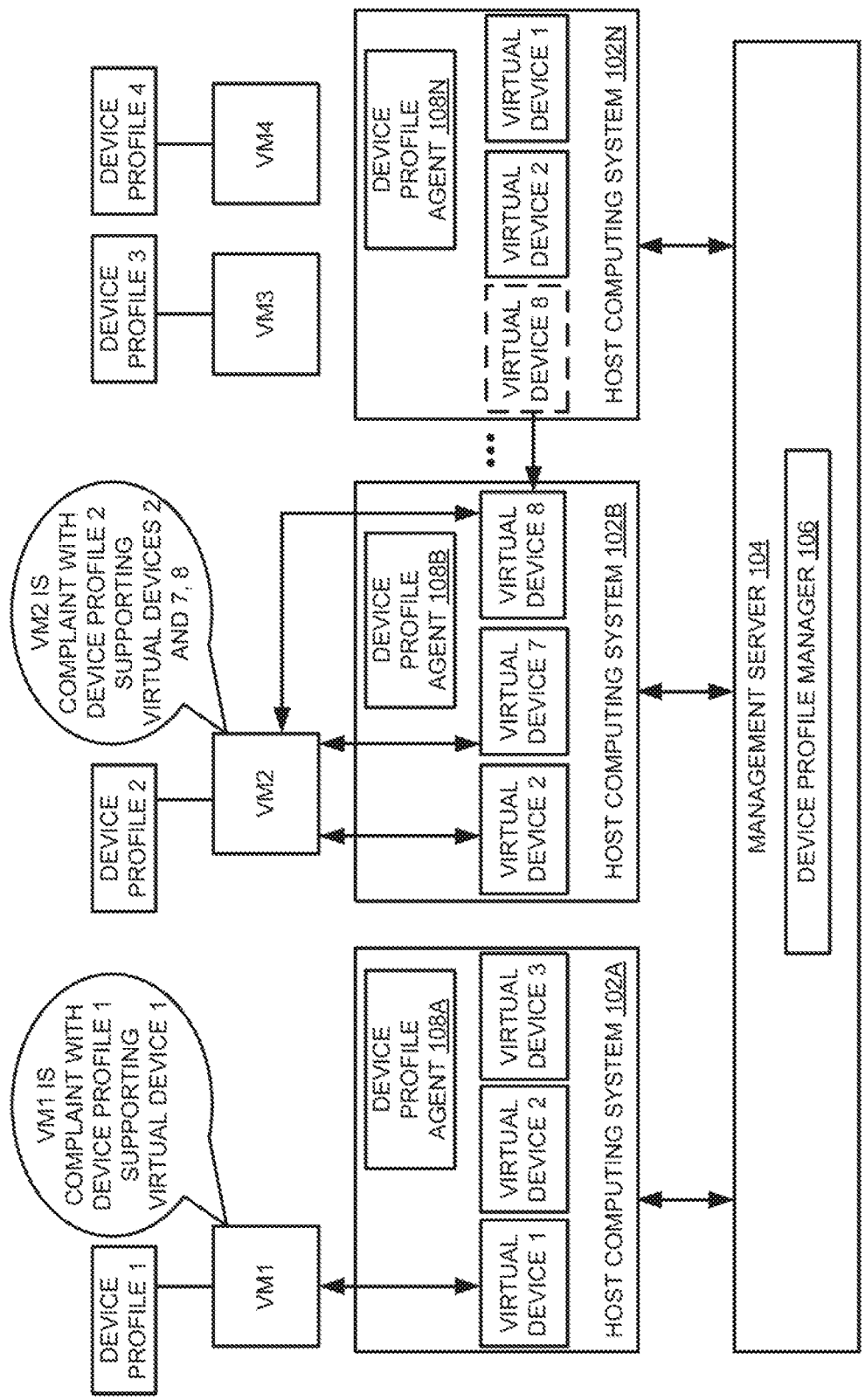
FIG. 3 is an example system view of a virtualized computing environment illustrating migrating a virtual device between the host computing systems based on compliance of a device profile assigned to a VM.

FIG. 3 is an example system view of a virtualized computing environment 300 illustrating migrating a virtual device (e.g., virtual device 8) between the host computing systems based on compliance of a device profile (e.g., device profile 2) assigned to a VM (e.g., VM2). As shown in FIG. 3, device profile 2 is assigned to VM2. In this example, device profile 2 includes details of virtual devices 2, 7, and 8 and associated capabilities. Therefore, VM2 may require virtual devices 2, 7, and 8 to make the device profile 2 compliant. In the example shown in FIG. 2, the virtual devices 2 and 7 are being operated on host computing system 102B on which VM2 runs. Therefore, virtual devices 2 and 7 can be attached to VM2. However, host computing system 102B does not include or operate virtual device 8.

In one example, device profile manager 106 may identify virtual device 8 and associated configurations that can be migrated to make the device profile 2 compliant. Further, device profile manager 106 may identify host computing system 102N that operates virtual device 8. In one example, device profile manager 106 may identify host computing system 102N that operates virtual device 8 based on the mapping information. Further, device profile manager 106 may migrate virtual device 8 and associated configurations from host computing system 102N to host computing system 102B such that migrated virtual device 8 operates in host computing system 102B. Virtual device 8 can be migrated to host computing system 102B using a distributed resource scheduling mechanism that considers resources (e.g., processor, memory, and the like) availability in host computing system 102B for migrating virtual device 8.

Further, device profile manager 106 may attach virtual device 8 to VM2 to support the compliance of device profile 2 upon migrating virtual device 8. In one example, virtual device 8 can be attached to VM2 via VM reconfigurations. As shown in FIG. 3, VM 2 is compliant with device profile 2 that supports virtual devices 2, 7, and 8 upon attaching the virtual device 8 to VM2.

Figure 4:
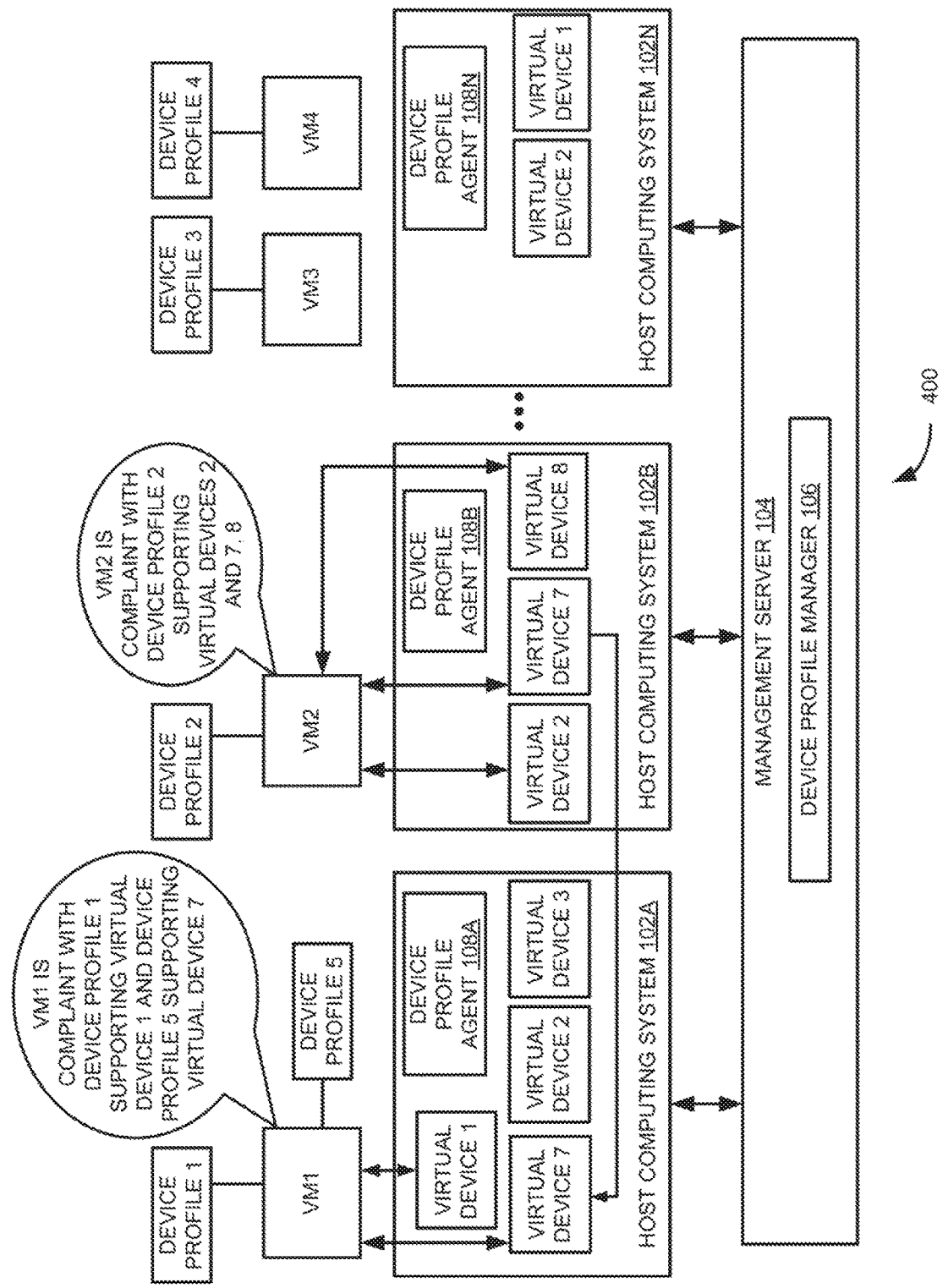
FIG. 4 is another example system view of a virtualized computing environment illustrating a cloning operation to duplicate a virtual device between the host computing systems based on compliance of a device profile assigned to a VM.

FIG. 4 is another example system view of a virtualized computing environment 400 illustrating a cloning operation to duplicate a virtual device (e.g., virtual device 7) between the host computing systems based on compliance of a device profile (e.g., device profile 5) assigned to a VM (e.g., VM1). As shown in FIG. 4, VM1 is compliant with device profile 1 that supports virtual device 1. Consider that VM1 is attached with a new device profile 5 to support additional virtual device 7 that is not currently associated with VM1. However, host computing system 102A may have the relevant physical backend to support virtual device 7.

In this example, device profile manager 106 may identify host computing system 102B that operates virtual device 7. Further, virtual device 7 is also attached to VM2 running on host computing system 102B. In other words, virtual device 7 is already in use by host computing system 102B. In this example, device profile manager 106 may perform a cloning operation to clone/duplicate the virtual device 7 in host computing system 102A from host computing system 102B such that cloned virtual device 7 operates in host computing system 102A. In direct cloning, virtual devices operated in one host computing system can be directly cloned to other host computing systems in the cluster. The cloned virtual device 7 may include settings of the original virtual device 7. Further, device profile manager 106 may attach cloned virtual device 7 to VM1 to support the compliance of device profile 5. In one example, a distributed resource scheduling mechanism can help in cloning virtual device 7 supporting device profile 5 to maintain the VM compliance.

Figures 5, 6:
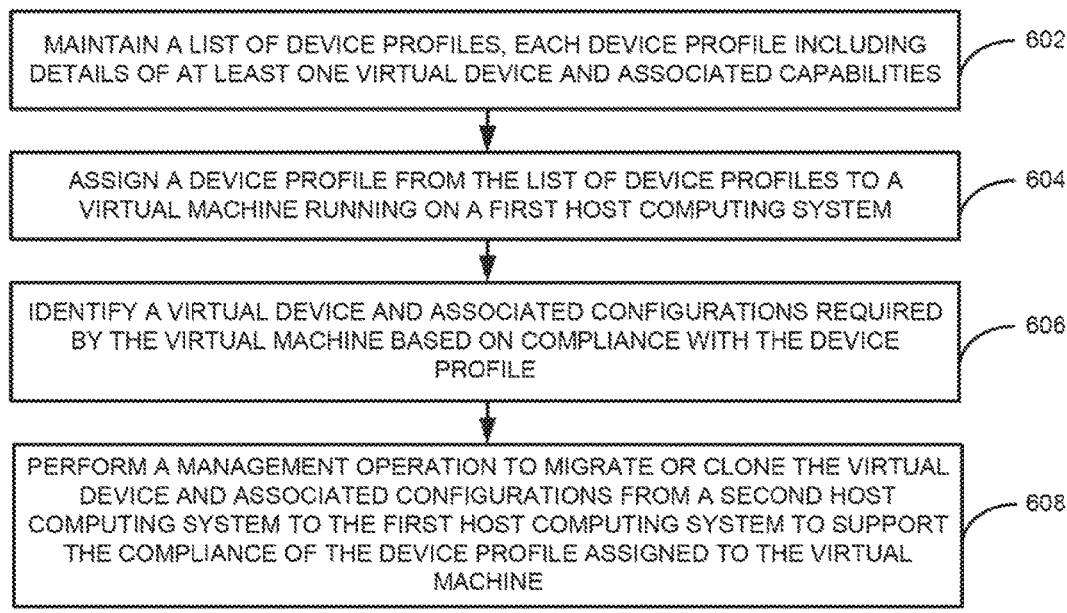
FIG. 5 is an example table depicting metadata stored in a device profile manager.
FIG. 6 is a flow diagram of an example method for migrating or cloning a virtual device from a second host computing system to a first host computing system based on compliance of a device profile assigned to a VM.

FIG. 5 is an example table 500 depicting metadata stored in device profile manager 106. Example metadata may include mapping information that maps device profiles to host computing systems that supports/complies with the device profiles. Further, table 500 depicts assigning device profiles to VMs in the cluster. As shown in row 502 of table 500, device profile 1 may include details of virtual devices (e.g., SSD (250 GB) and fax module) and associated capabilities. Further, device profile 1 may be attached to VM1 and VM3. Furthermore, host computing system (i.e., host 1) may supports/complies with device profile 1. Therefore, VM1 and VM3 are placed on host 1 that complies with device profile 1. In another example, host computing system (i.e., host 6) does not support/compliant with device profile 1 (e.g., row 504). In this example, VM8 and VM10 with assigned device profile 1 can be provisioned on host 6 by migrating or cloning relevant virtual devices to host 6 to make device profile 1 compliant.

An example of device profile manager 106 can be implemented in VMware vRealize Automation™ and/or virtualization management functionalities\features (e.g., VMware vSphere® High Availability (HA), VMware vSphere® Distributed Resource Scheduler™ (DRS), and the like) offered by VMware. In one example, device profile manager 106 may be implemented as engines or modules comprising any combination of hardware and programming to implement the functionalities described herein. Device profile manager 106 can be a service process in the management application or can be an appliance running in the data center to cater multiple management applications in a cloud based environment. For example, management application may be vSphere virtual center that is offered by VMware. Management application can be provided in a physical server, VM, or container. Device profile manager 106 can process the device profiles, validate whether the associated device profile can honor the virtual device requirements of the VM with respect to the host computing systems available, and accordingly apply the recommendations via the DRS and HA.

In some examples, the functionalities described herein, in relation to instructions to implement functions of device profile manager 106 and device profile agents 108A-N and any additional instructions described herein in relation to the storage medium, may be implemented as engines or modules comprising any combination of hardware and programming to implement the functionalities of the modules or engines described herein. The functions of device profile manager 106 may also be implemented by the processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Although certain terms are used primarily herein, other terms could be used interchangeably to yield equivalent embodiments and examples. For example, the term "host computing system" may be used interchangeably with "physical host", "physical machine" or "physical device". Further, the terms "dynamic" and "automatic" are also used interchangeably throughout the document. Further for example, it is well-known that equivalent terms in the field of system virtualization or similar or related fields could be substituted for such terms as "physical computer," "hypervisor," "VM," or the like. Furthermore, the terms "cluster" may refer to a group of host computing systems that work together in a physical or virtual computing environment.

Example Processes

FIG. 6 is a flow diagram 600 of an example method for migrating or cloning a virtual device from a second host computing system to a first host computing system based on compliance of a device profile assigned to a VM. It should be understood that the process depicted in FIG. 6 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 602, a list of device profiles may be maintained, each device profile including details of at least one virtual device and associated capabilities. For example, some virtual devices may be associated with associated physical devices. The list of device profiles may be maintained in memory of a server. Memory may be an internal memory or an external storage device connected to the server. Further, mapping information may be maintained in the memory of the server. The mapping information may map the list of device profiles to a corresponding one of a plurality of host computing systems that supports the device profiles. In some examples, each device profile in the list of device profiles is assigned a priority (e.g., in the range of 1-N, with 1 being the highest priority).

At 604, a device profile from the list of device profiles may be assigned to a VM running on a first host computing system. At 606, a virtual device and associated configurations required by the VM can be identified based on compliance with the device profile. At 608, a management operation may be performed to migrate/clone the virtual device and associated configurations from a second host computing system to the first host computing system to support the compliance of the device profile assigned to the VM (e.g., based on the assigned priority). Example management operation may include a virtual device cloning or a virtual device migration.

In one example, the second host computing system that operates the virtual device may be identified, for instance, based on the mapping information. The virtual device and associated configurations may be migrated/cloned from the identified second host computing system to the first host computing system such that the migrated/cloned virtual device operates in the first host computing system. Further, the virtual device may be attached to the VM to support the compliance of the device profile upon migrating/cloning the virtual device. The virtual device can be attached to the VM via VM reconfigurations.

Figure 7:
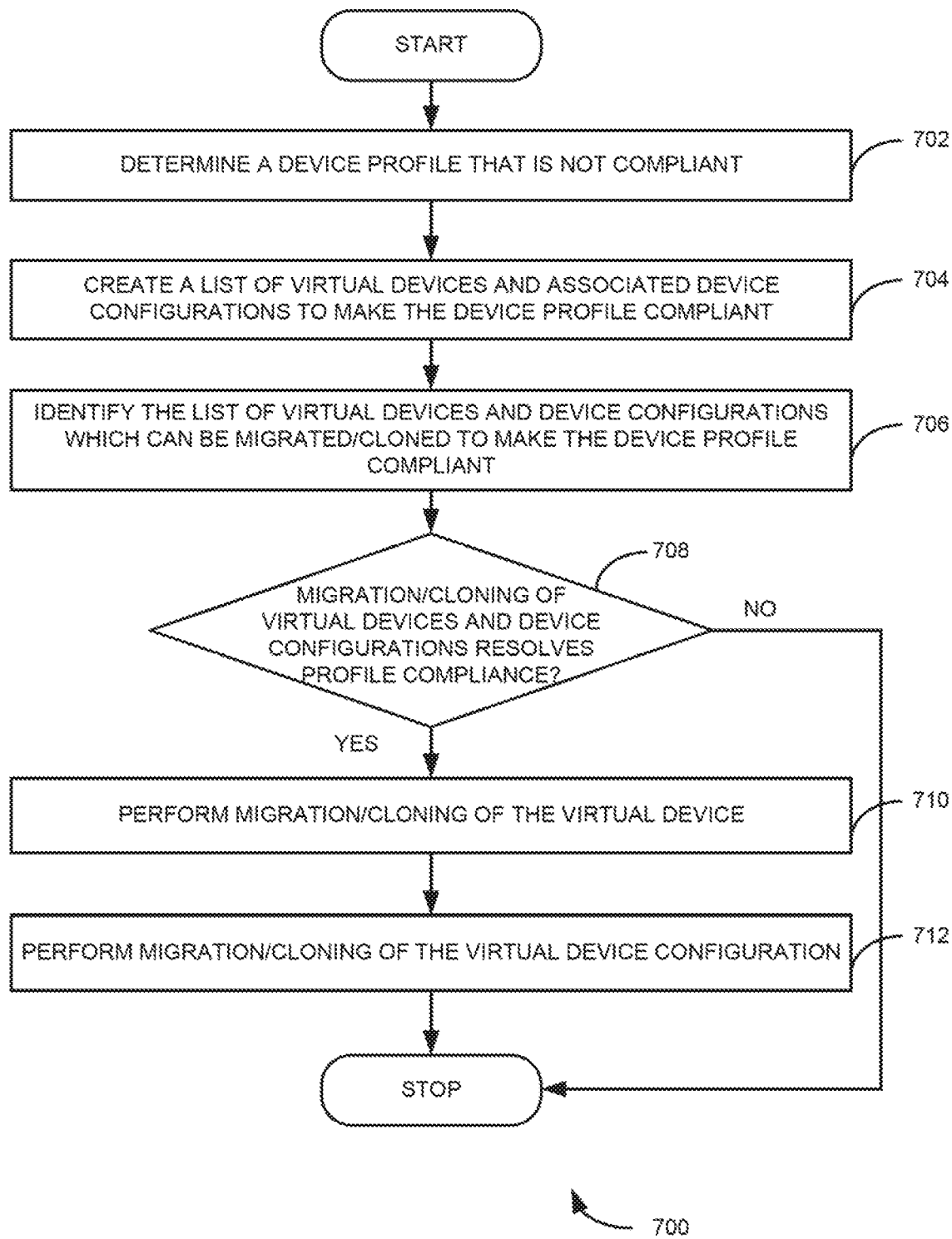
FIG. 7 is a detailed flow diagram of an example method for migrating or cloning virtual devices between host computing systems to support compliance of device profiles assigned to VMs.

FIG. 7 is a detailed flow diagram 700 of an example method for migrating or cloning virtual devices between host computing systems to support compliance of device profiles assigned to VMs. At step 702, a device profile that is not compliant with a host computing system is identified in a cluster. The device profile is assigned to a VM running on the host computing system.

Further at 704, a list of virtual devices and associated configurations may be created to make the device profile compliant. At 706, the list of virtual devices and device configurations that can be migrated/cloned from other host computing systems to make the device profile compliant may be identified. At 708, a check is made to determine whether migration/cloning of the virtual devices and device configurations resolves device profile compliance. When the migration/cloning of the virtual devices and device configurations resolves device profile compliance, then the virtual devices are migrated/cloned from the other host computing systems, at 710. At 712, the device configurations are migrated/cloned from the other host computing systems. Further, the virtual devices and device configurations are attached to the VM to make the device profile compliant. Steps 710 and 712 can be implemented as a part of VMware DRS™ offered by VMware.

Although the flow diagram of FIGS. 6 and 7 illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

Figure 8:
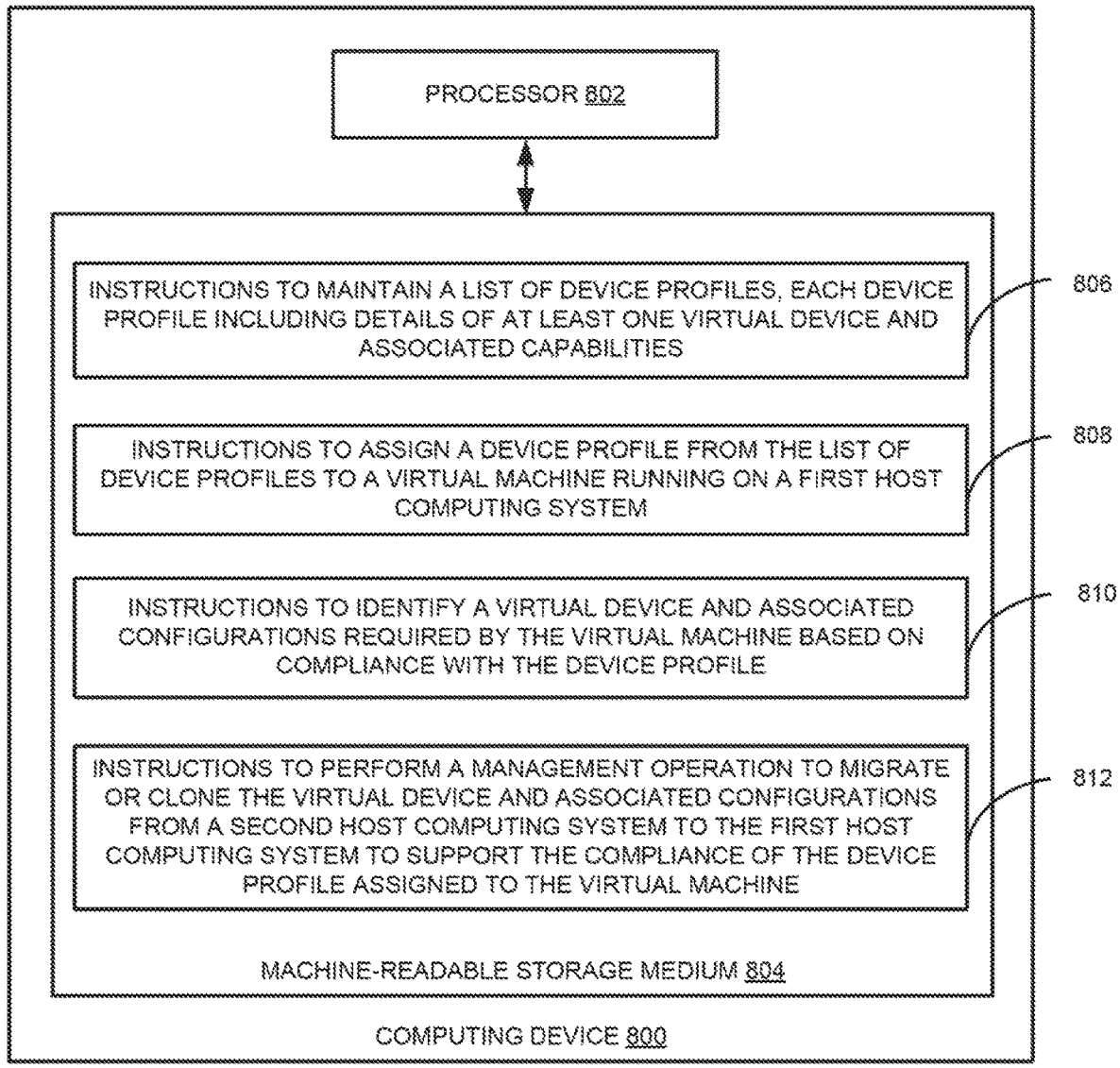
FIG. 8 is a block diagram of an example computing device including a non-transitory computer-readable storage medium storing instructions to migrate or clone a virtual device from a second host computing system to a first host computing system based on compliance of a device profile assigned to a VM.

FIG. 8 is a block diagram of an example computing device 800 including a non-transitory computer-readable storage medium 804 storing instructions to migrate or clone a virtual device from a second host computing system to a first host computing system based on compliance of a device profile assigned to a VM.

The computing device 800 includes a processor 802 and machine-readable storage medium 804 communicatively coupled through a system bus. The processor 802 may be any type of central processing unit (CPU), microprocessor, or processing logic that interprets and executes machine-readable instructions stored in the machine-readable storage medium 804. The machine-readable storage medium 804 may be a random-access memory (RAM) or another type of dynamic storage device that may store information and machine-readable instructions that may be executed by the processor 802. For example, the machine-readable storage medium 804 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 804 may be a non-transitory machine-readable medium. In an example, the machine-readable storage medium 804 may be remote but accessible to the computing device 800.

The machine-readable storage medium 804 may store instructions 806 to 812. In an example, instructions 806 to 812 may be executed by processor 802 for migrating or cloning a virtual device from a second host computing system to a first host computing system based on compliance of a device profile assigned to a VM. Instructions 806 may be executed by processor 802 to maintain a list of device profiles, each device profile including details of at least one virtual device and associated capabilities. Instructions 808 may be executed by processor 802 to assign a device profile from the list of device profiles to a VM running on a first host computing system. Instructions 810 may be executed by processor 802 to identify a virtual device and associated configurations required by the VM based on compliance with the device profile. Instructions 812 may be executed by processor 802 to perform a management operation to migrate or clone the virtual device and associated configurations from a second host computing system to the first host computing system to support the compliance of the device profile assigned to the VM.

The machine-readable storage medium 804 may include instructions to maintain mapping information in memory, the mapping information maps the list of device profiles to a corresponding one of the host computing systems that supports the device profiles. In one example, non-transitory machine-readable medium 804 may include instructions to establish a communication with the plurality of host computing systems, obtain information related to addition, modification or deletion of virtual devices and associated versions in the plurality of host computing systems, and update the mapping information in the memory associated with computing device 800 (e.g., management server 104) based on the obtained information. In one example, the second host computing system that operates the virtual device can be identified based on the mapping information.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    maintaining a list of device profiles, each device profile including details of at least one virtual device and associated capabilities;
    assigning a device profile from the list of device profiles to a virtual machine running on a first host computing system;
    identifying a virtual device and associated configurations required by the virtual machine to be in compliance with the assigned device profile;
    determining whether migration or cloning of the virtual devices without migrating the virtual machine resolves compliance by the virtual machine with the assigned device profile;
    upon determining that migration or cloning of the virtual devices resolves compliance by the virtual machine with the assigned device profile, performing a management operation including migrating or cloning of the virtual device and associated configurations from a second host computing system to the first host computing system to support the compliance by the virtual machine with the assigned device profile, without migrating the virtual machine; and
    attaching the virtual device to the virtual machine to support the compliance of the device profile upon migrating or cloning the virtual device, wherein the virtual device is attached to the virtual machine via virtual machine reconfigurations.

2. The method of claim 1, wherein migrating or cloning the virtual device and associated configurations from the second host computing system to the first host computing system comprises:
    identifying the second host computing system that operates the virtual device; and
    migrating or cloning the virtual device and associated configurations from the identified second host computing system to the first host computing system such that the migrated or cloned virtual device operates in the first host computing system.

3. The method of claim 1, further comprising:
    maintaining mapping information, wherein the mapping information maps the list of device profiles to a corresponding one of a plurality of host computing systems that supports the device profiles.

4. The method of claim 3, wherein migrating or cloning the virtual device and associated configurations from the second host computing system to the first host computing system comprises:
    identifying the second host computing system that operates the virtual device based on the mapping information; and
    migrating or cloning the virtual device and associated configurations from the identified second host computing system to the first host computing system such that the migrated or cloned virtual device operates in the first host computing system.

5. The method of claim 1, wherein the at least or e virtual device is associated with a physical device.

6. The method of claim 1, wherein performing the management operation to migrate or clone the virtual device and associated configurations from the second host computing system to the first host computing system comprises one of:
    performing the management operation to migrate the virtual device and associated configurations from the second host computing system to the fast host computing system when the virtual device is not in use by the second host computing system; and
    performing the management operation to clone the virtual device and associated configurations from the second host computing system to the first host computing system when the virtual device is in use by the second host computing system.

7. The method of claim 1, wherein each device profile in the list of device profiles is assigned a priority.

8. A system comprising:
    a plurality of host computing systems, each host computing system including virtual machines running therein; and
    a management server communicative with the plurality of host computing systems, wherein the management server includes a device profile manager to;
        maintain all of device profiles, each device profile including details of at least one virtual device and associated capabilities;
        assign a device profile from the list of device profiles to a virtual machine running on a first host computing system;
        identify a virtual device and associated configurations required by the virtual machine to be in compliance with the assigned device profile;
        determine whether migration or cloning of the virtual devices without migrating the virtual machine resolves compliance by the virtual machine with the assigned device profile;

upon determining that migration or cloning of the virtual devices resolves compliance by the virtual machine with the assigned device profile, perform a management operation including migrating or cloning of the virtual device and associated configurations from a second host computing system to the first host computing system to support the compliance by the virtual machine with the assigned device profile, without migrating the virtual machine; and attach the virtual device to the virtual machine to support the compliance of the device profile upon migrating or cloning the virtual device, wherein the virtual device is attached to the virtual machine via virtual machine reconfigurations.

9. The system of claim 8, wherein the device profile manager is to:
identify the second host computing system that operates the virtual device; and
migrate or clone the virtual device and associated configurations from the identified second host computing system to the first host computing system such that the migrated or cloned virtual device operates in the first host computing system.

10. The system of claim 8, wherein the device profile manager is to:
maintain mapping information, wherein the mapping information maps the list of device profiles to a corresponding one of the plurality of host computing systems that supports the device profiles.

11. The system of claim 10, wherein the device profile manager is to:
identify the second host computing system that operates the virtual device based on the mapping information; and
migrate or clone the virtual device and associated configurations from the identified second host computing system to the first host computing system such that the migrated or cloned virtual device operates in the first host computing system.

12. The system of claim 10, wherein the device profile manager is to:
obtain information related to addition, modification, or deletion of virtual devices and associated versions in the plurality of host computing systems via a device profile agent residing in each of the plurality of host computing systems; and
update the mapping information based on the obtained information.

13. A non-transitory machine-readable medium storing instructions executable by a processing resource to:
maintain a list of device profiles, each device profile including details of at least one virtual device and associated capabilities;
assign a device profile from the list of device profiles to a virtual machine running on a first host computing system;
identify a virtual device and associated configurations required by the virtual machine to be in compliance with the assigned device profile;
determine whether migration or cloning of the virtual devices without migrating the virtual machine resolves compliance by the virtual machine with the assigned device profile;
upon determining that migration or cloning of the virtual devices resolves compliance by the virtual machine with the assigned device profile, perform a management operation including migrating or cloning of the virtual device and associated configurations from a second host computing system to the first host computing system to support the compliance by the virtual machine with the assigned device profile, without migrating the virtual machine; and
attach the virtual device to the virtual machine to support the compliance of the device profile upon migrating or cloning the virtual device, wherein the virtual device is attached to the virtual machine via virtual machine reconfigurations.

14. The non-transitory machine-readable medium of claim 13, further comprising instructions to:
maintain mapping information in a memory, wherein the mapping information maps the list of device profiles to a corresponding one of a plurality of host computing systems that supports the device profiles.

15. The non-transitory machine-readable medium of claim 14, wherein migrating or cloning the virtual device and associated configurations from the second host computing system to the first host computing system comprises:
identifying the second host computing system that operates the virtual device based on the mapping information; and
migrating or cloning the virtual device and associated configurations from the identified second host computing system to the first host computing system such that the migrated or cloned virtual device operates in the first host computing system.

16. The non-transitory machine-readable medium of claim 14, comprising instructions to:
establish a communication with the plurality of host computing systems;
obtain information related to addition, modification or deletion of virtual devices and associated versions in the plurality of host computing systems; and
update the mapping information in the memory based on the obtained information.

17. The non-transitory machine-readable medium of claim 13, wherein the at least one virtual device is selected from a group consisting of a virtual network interface card (vNIC), a virtual compact disc read-only-memory (vCDROM), a virtual graphics processing unit (vGPU) card, and a virtual small computer system interface (vSCSI) card.

* * * * *